C. A. WULF.
FLUSHING VALVE.
APPLICATION FILED DEC. 21, 1911.
1,146,832.
Patented July 20, 1915.
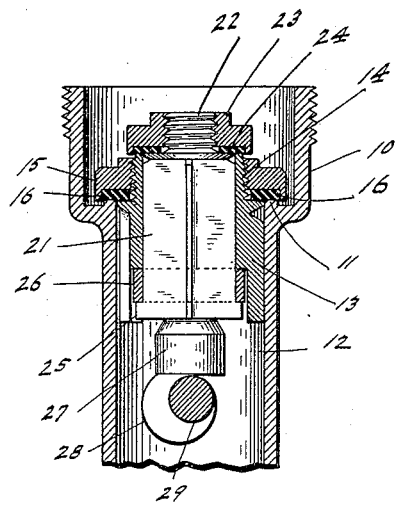
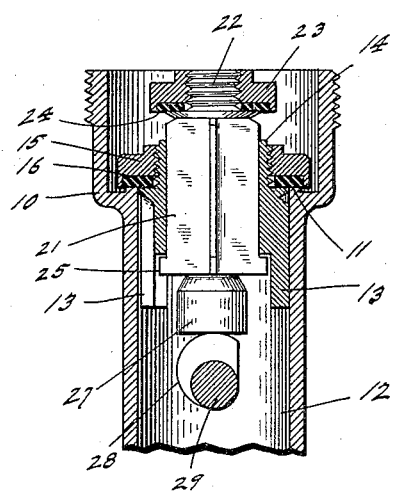
Witnesses
Frank A. Fahle
May Layden
Inventor
Charles A. Wulf,
By Arthur M. Hood
Attorney

UNITED STATES PATENT OFFICE.

CHARLES A. WULF, OF INDIANAPOLIS, INDIANA.

FLUSHING-VALVE.

1,146,832.  Specification of Letters Patent.  Patented July 20, 1915.

Application filed December 21, 1911. Serial No. 667,132.

*To all whom it may concern:*

Be it known that I, CHARLES A. WULF, a citizen of the United States, residing at Indianapolis, in the county of Marion and State of Indiana, have invented a new and useful Flushing-Valve, of which the following is a specification.

The object of my invention is to provide an improved form of valve, especially designed for use in direct pressure flushing outfits.

The accompanying drawings illustrate my invention.

Figure 1 is an axial section showing the parts in condition where the inner valve has no possibility of movement independent of the outer valve and Fig. 2 is a similar section showing the parts in condition where only the inner valve may be operated.
The device is more especially designed for use in an apparatus of the general type shown in my prior Patent No. 984,410 although the present improvements may be used in other direct pressure outfits.

In the installation of direct pressure outfits of the class described, it is desirable that the flushing flow be at as great a volume as possible, but where the pressure of water is too great, it is difficult to raise the valve initially from its seat. It is also found that the pressure under which devices of this type must work varies very materially in different cities. On the other hand, it is desirable from a manufacturing standpoint that the outfit be of standard construction for all conditions and that it be substantially fool proof. My present valve is, therefore, designed so that it may be furnished as a standard piece primarily for use with low pressures but, by the simple removal of one member, it may be fitted for use under high pressures, thus requiring no particular skill in its installation.

In the drawings, 10 indicates the main fitting within which the valve is to be mounted, said fitting having an annular seat 11 between its inlet and outlet. Mounted within the bore 12 of member 10, is a spider 13 which is provided at its upper end with a tubular shank 14 threaded to receive a packing cup 15 the under face of which is recessed to receive a packing ring 16 adapted to seat upon the seat 11. Shank 14 is bored centrally and within said bore is mounted a spider 21 which, at its upper end, is provided with a threaded shank 22 formed to receive a packing cup 23 recessed upon its under face to receive a packing ring 24 which may be brought down upon the upper end of the sleeve 14 to thus form a closure for preventing flow of water through the bore of sleeve 14. Spider 21 is projected entirely through the sleeve 14 and at its lower end is provided with lateral extensions 25 between which and the lower end of sleeve 14 I mount a ring 26 of such axial length that, when the cup 23 is screwed down upon screw 22, packing 24 may be brought tightly against the upper end of sleeve 14 and ring 26 will be clamping between extensions 25 and the lower end of sleeve 14, the arrangement being such that, with the ring 26 in position, there can be no relative movement of the spider 21 within sleeve 14 and therefore can be no movement of the packing ring 24 relative to its seat from the upper end of sleeve 14. The axial length of ring 26 is such that, if it be withdrawn, there may be axial movement of the inner valve structure within the outer valve structure. An operating means of any desired form is provided, said operating means being of such character, however, that when the ring 26 is removed, the inner valve structure cannot be moved by it to an extent sufficient to lift the outer valve structure from its seat. In order to operate the valves, I provide the lower end of the inner valve with a depending pin 27 arranged to be engaged by a cam 28 carried by a rock shaft 29.

When the device is to be used under low pressures, ring 26 is in position and, when cam 28 is turned, it will operate upon pin 27 to lift both the inner and outer valve structures simultaneously, the outer valve structure being thus lifted from the seat without any preliminary lifting of the inner valve structure from its seat.

When the device is to be used under such high pressures too great difficulty would be experienced in initially forcing the outer valve structure from its seat; so under such conditions ring 26 is withdrawn, whereupon operation of cam 28 will drive the inner valve structure upwardly through the outer valve structure, the outer valve structure remaining stationary under all conditions. By this arrangement, I am able to produce a standard structure which will be furnished under all conditions, the ring 26 being readily extracted whenever it is found advisable by reason of the high pressure under which the particular device must operate.

I claim as my invention:

A direct pressure flushing valve comprising an annular valve member, a valve projected therethrough and longitudinally movable therein, the annular valve having an annular seat formed to receive the inner valve, and a ring removably inserted between the inner valve and the outer valve to prevent relative movement of the two valves.

In witness whereof, I have hereunto set my hand and seal at Indianapolis, Indiana, this 1st day of December, A. D. one thousand nine hundred and eleven.

CHARLES A. WULF. [L. S.]

Witnesses:
ARTHUR M. HOOD,
FRANK A. FAHLE.

Copies of this patent may be obtained for five cents each, by addressing the "Commissioner of Patents, Washington, D. C."